(12) United States Patent
Choi et al.

(10) Patent No.: US 8,331,255 B2
(45) Date of Patent: Dec. 11, 2012

(54) MULTIPLE BEAMFORMING METHOD AND APPARATUS

(75) Inventors: In-Kyeong Choi, Daejeon (KR); Dong Seung Kwon, Daejeon (KR); Ji Won Kang, Incheon (KR); Chung Yong Lee, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 12/677,630

(22) PCT Filed: Sep. 11, 2008

(86) PCT No.: PCT/KR2008/005397
§ 371 (c)(1),
(2), (4) Date: Mar. 11, 2010

(87) PCT Pub. No.: WO2009/035284
PCT Pub. Date: Mar. 19, 2009

(65) Prior Publication Data
US 2010/0189002 A1    Jul. 29, 2010

(30) Foreign Application Priority Data
Sep. 14, 2007  (KR) .......................... 10-2007-0093542

(51) Int. Cl.
*H04W 4/00* (2009.01)
(52) U.S. Cl. ........................................ 370/252; 370/334
(58) Field of Classification Search .................. 370/229, 370/230, 232, 235, 252, 253, 342, 328, 329, 370/334, 335, 336; 375/260, 267, 299
See application file for complete search history.

(56) References Cited

U.S. PATENT DOCUMENTS 7,505,529 B2 * 3/2009 Kwak et al. ................... 375/295
(Continued)

FOREIGN PATENT DOCUMENTS

| EP | 1 259 008 A2 | 11/2002 |
| KR | 10-2006-0050441 A | 5/2006 |
| KR | 10-2006-0124088 A | 12/2006 |
| WO | 03/021795 A2 | 3/2003 |

OTHER PUBLICATIONS

Pramod Viswanath et al., Opportunistic Beamforming Using Dumb Antennas, Invited Paper, Jun. 6, 2002, , pp. 1277-1294, vol. 48, No. 6, IEEE Transactions on Information Theory.

(Continued)

*Primary Examiner* — Yemane Mesfin
*Assistant Examiner* — Mon Cheri Davenport
(74) *Attorney, Agent, or Firm* — Jefferson IP Law, LLP (57) ABSTRACT

The present invention relates to a beamforming method and apparatus. A beamforming method for use in a base station for transmitting a plurality of streams through a plurality of antennas includes: receiving feedback information including information on a first codeword selected from a codebook including a plurality of codewords from each of a plurality of user terminals; grouping the plurality of user terminals by use of the feedback information from each user terminal; determining a user terminal to which a plurality of streams will be assigned of the plurality of user terminals, and determining a second codeword to be used for beamforming from the codebook by use of the feedback information of each user terminal and grouping information; and multiplying data to be transmitted through the plurality of steams by the second codeword and a unitary matrix.

20 Claims, 7 Drawing Sheets

U.S. PATENT DOCUMENTS

| | | | |
|---|---|---|---|
| 7,778,826 B2* | 8/2010 | Lin et al. | 704/223 |
| 7,885,348 B2* | 2/2011 | Li et al. | 375/267 |
| 2004/0152491 A1* | 8/2004 | Lobinger et al. | 455/561 |

OTHER PUBLICATIONS

Masourd Sharif et al., On the Capacity of MIMO Broadcast Channel with Partial Side Information, IEEE Transactions on Information Theory, Jun. 25, 2003, pp. 506-522, vol. 51, Department of Electrical Engineering.

Samsung, Downlink MIMO for EUTRA, 3GPP TSG RAN WG1 Meeting #44, Feb. 13-17, 2006, Denver, USA.

Jiwon Kang et al., An Opportunistic Beamforming Technique Using a Quantized Codebook, IEEE Vehicular Technology Conference (VTC'07-Spring), May 29, 2007, pp. 1647-1651.

* cited by examiner

MULTIPLE BEAMFORMING METHOD AND APPARATUS

TECHNICAL FIELD

The present invention relates to a beamforming method and apparatus, and particularly to a multiple beamforming method and apparatus capable of obtaining multiple user diversity gain in a multiple-user environment.

BACKGROUND ART

Multiple user diversity gain in a multiple-user environment is obtained by monitoring a change in an independent fading channel for each user and by performing resource allocation when a channel for each user substantially becomes the best state through scheduling. As the change of the channel is increased, the diversity gain is increased. Accordingly, the diversity gain is limited under a channel environment where the change of the channel is small or slow.

Opportunistic beamforming (hereinafter referred to as "OBF") uses a plurality of transmitting antennas to induce a large and fast change in an arbitrary channel, resulting in multiple-user diversity gain. Based on the possibility that a user for whom a channel is in the best state always exists is high if there are many users, OBF performs wireless resource allocation to the user for whom the channel is in the best state for a corresponding timeslot, thereby improving system capacity. However, since OBF generates only one beam every timeslot, the performance is not good, if the number of users is small.

Codebook-based opportunistic beamforming (hereinafter referred to as "COBF") that has appeared for making up for the drawback uses a random unitary matrix having a pattern defined in existing codebook-based beamforming (hereinafter referred to as "CBF") to obtain multiple-user diversity gain and thus has system capacity that is larger than the existing OBF or CBF. A random unitary matrix having a pattern defined in COBF induces a change in a channel without increasing transmission power to achieve an opportunistic effect, and many codewords in a codebook give diversity in beamforming vector selection to individual users, resulting in excellent performance even if the number of users is small.

However, since OBF and COBF use multiple transmitting antennas to transmit one stream every timeslot, they cannot make full use of the spatial degree of freedom of multiple antennas.

Meanwhile, opportunistic multiple beamforming (hereinafter referred to as "OMBF") which is a space division multiple access (hereinafter referred to as "SDMA") scheme of simultaneously transmitting multiple streams to a plurality of users using the same resource through multiple beams by multiple antennas, and PU2RC (per user unitary rate control) which is an SDMA scheme using a codebook including a plurality of unitary matrixes, are multiple user MIMO (multiple-input multiple-output) schemes that increase the availability of the spatial degree of freedom, thereby improving the system capacity.

However, since OMBF should find an appropriate user with a set of multiple beams every timeslot, the performance may be deteriorated if the number of users is small, and PU2RC may not obtain sufficient multiple-user diversity gain in a channel environment in which a change in a channel is small or slow.

Further, according to a codebook-based pre-coding scheme, since the amount of channel information increases as the size of a codebook increases, the probability that each user achieves the best channel gain increases and thus the performance of the pre-coding is improved. However, if the size of the codebook is largecodeword system overhead for the feedback increases when every user terminal feeds the codeword index selected by itself back. In particular, since the overhead linearly increases as the number of users increases, serious problems may occur when a common channel is used to perform the feedback.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a multiple beamforming method, which has advantages of achieving sufficient multiple user diversity gain and making full use of the spatial degree of freedom by multiple antennas, and a beamforming method capable of reducing feedback overhead with respect to a codebook.

Technical Solution

An exemplary embodiment of the present invention provides a beamforming method for use in a base station for transmitting a plurality of streams through a plurality of antennas, the method including: receiving feedback information including information on a first codeword selected from a codebook including a plurality of codewords from each of a plurality of user terminals; grouping the plurality of user terminals by use of the feedback information from each user terminal; determining a user terminal to which the plurality of streams will be assigned, of the plurality of user terminals, and determining a second codeword to be used for beamforming from the codebook, by use of the feedback information of each user terminal and grouping information; and multiplying data to be transmitted through the plurality of steams by the second codeword and a unitary matrix.

Another embodiment of the present invention provides a beamforming method for use in a base station for transmitting a plurality of streams through a plurality of antennas, the method including: receiving feedback information including information on an index of a first codeword selected from a codebook including a plurality of codewords from each of a plurality of user terminals; determining a second codeword to be used for pre-coding from the codewords of the codebook and a user terminal to which all of the plurality of streams will be assigned; and multiplying data to be transmitted to the user terminal to which all of the plurality of streams will be assigned, by the second codeword and a unitary matrix.

Yet another embodiment of the present invention provides a beamforming method for use in a base station for transmitting one data stream through a plurality of antennas, the method including: dividing a plurality of codewords of a codebook into a plurality of codeword groups; determining a codeword group to be used in a corresponding timeslot from the plurality of codeword groups; receiving feedback information including an index of a first codeword selected from the determined codeword group from each of a plurality of user terminals; determining a user terminal to which data will be transmitted in a corresponding timeslot by use of the feedback information of user terminal, and determining the first codeword of the user terminal to which data will be transmitted in the corresponding timeslot as the second codeword; and performing beamforming by use of the second codeword.

Another embodiment of the present invention provides a beamforming method for use in a base station for transmitting a plurality of streams through a plurality of antennas, the method including: dividing a plurality of codewords of a codebook into a plurality of codeword groups; determining a codeword group to be used in a corresponding timeslot from the plurality of codeword groups; receiving feedback information including an index of a first codeword selected from the determined codeword group from each of a plurality of user terminals; grouping the plurality of user terminals by use of the feedback information from the individual user terminals; determining a user terminal to which the plurality of streams will be assigned and a second codeword to be used for beamforming from the codebook by use of the feedback information of the individual user terminals and the results of the grouping of the plurality of user terminals; and performing beamforming by use of the second codeword.

Still another embodiment of the present invention provides a beamforming method for use in a base station for transmitting a plurality of streams through a plurality of antennas, the method including: dividing a plurality of codewords of a codebook including a plurality of codewords into a plurality of codeword groups; determining a codeword group to be used in a corresponding timeslot from the plurality of codeword groups; receiving feedback information including an index of a first codeword selected from the determined codeword group from each of a plurality of user terminals; determining a user terminal to which the plurality of streams will be assigned and a second codeword to be used for beamforming in the determined codeword group by use of the feedback information of the individual user terminals; and performing beamforming by use of the second codeword.

Advantageous Effects

As described above, embodiments of the present invention use unitary matrixes to improve multiple user diversity gain in slowly varying channel, including the capability of making full use of the spatial degree of freedom by multiple antennas and/or reducing feedback overhead.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the terms "-er", and "-or" described in the specification mean units for processing at least one function and operation and can be implemented by hardware components or software components and combinations thereof.

Now, a multiple beamforming method and apparatus according to a first exemplary embodiment of the present invention will be described in detail with reference to the accompanying drawings.

In a multiple beamforming method according to a first exemplary embodiment of the present invention, if individual user terminals feed back information including information on selected codewords and a stream-based signal to interference plus noise ratio (hereinafter referred to as "SINR") by the codewords to a base station, the base station uses the feedback information received from the individual users to determine one codeword, allocates data streams to the users having selected the determined codeword, and then simultaneously transmits a plurality of streams through a plurality of antennas. Hereinafter, the method is called codebook-based opportunistic multiple beamforming (hereinafter referred to as "COMBF"). In the first exemplary embodiment and other embodiments of the present invention, a codeword index is used as information on the codeword.

Figure 1:
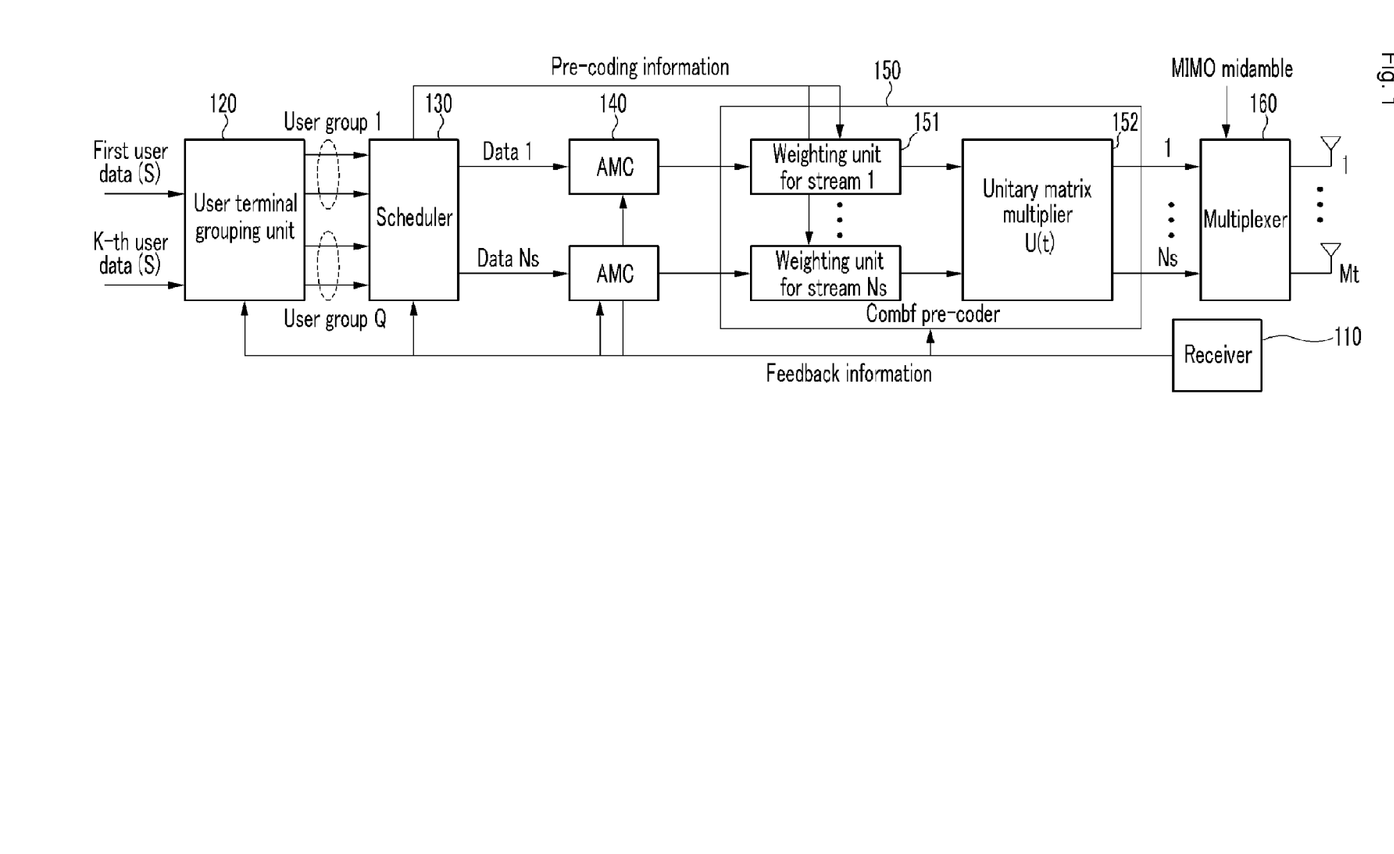
FIG. 1 is a schematic diagram illustrating a COMBF apparatus according to a first exemplary embodiment of the present invention.

FIG. 1 is a schematic diagram illustrating a COMBF apparatus according to a first exemplary embodiment of the present invention.

As shown in FIG. 1, a COMBF apparatus according to the first exemplary embodiment of the present invention includes a receiver 110, a user terminal grouping unit 120, a scheduler 130, adaptive modulating and coding units (hereinafter referred to as "AMCs") 140, a COMBF precoder 150, and a multiplexer 160.

The receiver 110 receives feedback information from individual user terminals and transmits the feedback information to the user terminal grouping unit 120, the scheduler 130, the AMCs 140, and the COMBF precoder 150. The feedback information includes indices of codeword selected by individual users and stream-based SINRs by the codewords.

The user terminal grouping unit 120 searches the feedback information on the individual users received from the receiver 110, and divides the users into a plurality of user terminal groups so that user terminals having selected the same codeword belong in the same user terminal group.

The scheduler 130 uses the feedback information on the individual users received from the receiver 110 to determine codewords to be used for pre-coding, and to determine the users to allocate radio resources of individual streams.

The scheduler compares stream-based SINRs of user terminals within user terminal groups and allocates each stream to a user terminal having the largest SINR of the corresponding stream. When the corresponding stream is allocated to the user terminal having the largest SINR as described above, the entire transmission rates are calculated by adding the rates of the selected user terminals from the user terminal groups and a codeword of a user terminal group having the largest entire transmission rate is selected.

The AMCs 140 perform modulating and coding on data to be transmitted.

The COMBF precoder 150 includes a plurality of weighting units 151 and a unitary matrix multiplier 152. The plurality of weighting units 151 multiply data to be transmitted in streams by column vectors corresponding to codewords that the scheduler 130 has determined. The unitary matrix multiplier 152 multiplies output values of the plurality of weighting units 151 by unitary matrixes to artificially induce an arbitrary channel change, thereby maximizing multiple user diversity gain.

The multiplexer 160 multiplexes the output values of the COMBF precoder 150, inserts multi-input multi-output midambles (hereinafter referred to as "MIMO midambles"), and transmits them through a plurality of transmitting antennas.

Figure 2:
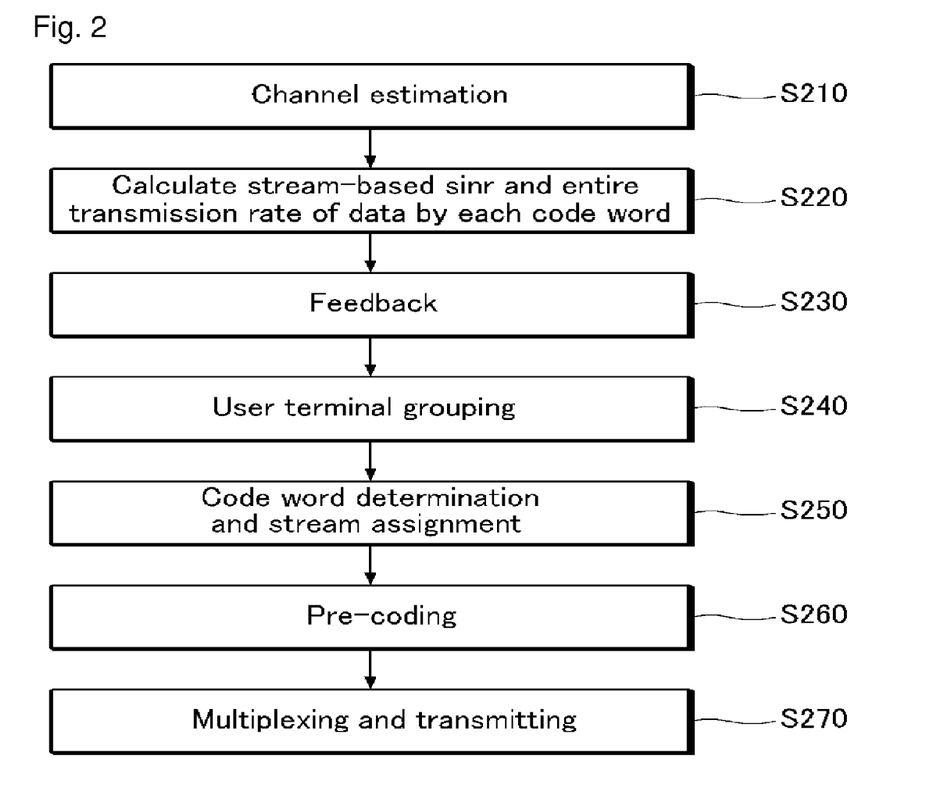
FIG. 2 is a flowchart illustrating a COMBF method according to an exemplary embodiment of the present invention.

Next, a COMBF method according to the first exemplary embodiment of the present invention is described in detail with reference to FIG. 2. FIG. 2 is a flowchart illustrating a COMBF method according to an exemplary embodiment of the present invention.

User terminals perform channel estimation by use of pilots transmitted through MIMO midambles (S210). A base station transmits the same number of (Mt) pilots as there are transmission antennas. A signal $y_k(t)$ that the user terminal k receives may be expressed by Equation 1.

$$y_k(t) = H_k p(t) + n_k(t) \quad \text{(Equation 1)}$$

Here, $p(t)$ is a pilot, $n_k(t)$ is a white noise and interference signal, $H_k$ is a channel between the base station and the user terminal k, and $\hat{H}_k$ is a channel that the k-th user terminal estimates by use of Equation 1.

The user terminal calculates stream-based SINRs by each codeword of a codebook, and calculates an entire transmission rate by using the stream-based SINRs of the data (S220).

First, a codebook and codewords are described. A codebook requiring C-bits to transmit an index of codeword that a user terminal selects is referred to as a C-bit codebook, and a C-bit codebook has $2^C$-number of codewords. Each codeword of a codebook for transmitting a single beam is composed of one vector, and each codeword of a codebook for transmitting multiple beams is composed of a matrix. Since the first exemplary embodiment of the present invention is a multiple beam transmitting method, each codeword is composed of a matrix and the q-th codeword $W_q$ is expressed, as in Equation 2.

$$W_q = [w_{q,1} \ldots w_{q,N_s}], \; q=0,1,2,\ldots,Q-1 \quad \text{(Equation 2)}$$

Q is the number of codewords included in the codebook, $N_s$ is the number of streams to be transmitted, and $w_{q,n}$ is the n-th column vector of the codewords $W_q$.

The user terminal uses an estimated channel $H_k$ and a random unitary matrix of a pattern appointed between a transmitter and a receiver in advance to measure transmission rate and stream-based SINR by each codeword of the codebook and to calculate the entire transmission rate of data that is capable of being transmitted through all streams. Table 1 represents the entire transmission rate and stream-based channel quality information (hereinafter referred to as "CQI") with respect to each codeword calculated in the user terminal. CQI may be SINR or transmission rate.

TABLE 1

| Codeword index | 0 | 1 | ... | Q − 1 |
|---|---|---|---|---|
| Stream 1 | $SINR_{0,1}$ (or $R_{0,1}$) | $SINR_{1,1}$ (or $R_{1,1}$) | ... | $SINR_{Q-1,1}$ (or $R_{Q-1,1}$) |
| Stream 2 | $SINR_{0,2}$ (or $R_{0,2}$) | $SINR_{1,2}$ (or $R_{1,2}$) | ... | $SINR_{Q-1,2}$ (or $R_{Q-1,2}$) |
| ... | ... | ... | ... | ... |
| Stream Ns | $SINR_{0,Ns}$ (or $R_{0,Ns}$) | $SINR_{1,Ns}$ (or $R_{1,Ns}$) | ... | $SINR_{Q-1,Ns}$ (or $R_{Q-1,Ns}$) |
| Entire transmission rate | $R_0$ | $R_1$ | ... | $R_{Q-1}$ |

Here, $SINR_{qk,n}$ indicates an SINR value calculated by the n-th column vector of a codeword matrix $q_k$ in a user terminal k, $R_{qk,n}$ indicates a transmission rate calculated by the n-th column vector of a codeword matrix $q_k$ in a user terminal k, and $R_q$ indicates an entire transmission rate calculated by using $SINR_{qk,n}$ or $R_{qk,n}$.

The user terminal selects a codeword corresponding to the largest entire transmission rate, and transmits an index $q_k^*$ of the selected codeword and a stream-based SINR by the selected codeword to the base station as feedback information (S230). At this time, the user terminal may feed back the index $q_k^*$ of the selected codeword, an index of a stream corresponding to the largest SINR, and the SINR, and does not feed back SINRs of the reminder streams. In this case, a base station scheduler allocates only one stream to the corresponding terminal.

The user terminal grouping unit 120 of the base station uses feedback information received from the individual user terminals to divide the user terminals into one or more groups (S240). At this time, the user terminals are grouped so that user terminals having selected the same codeword belong in one same group. Then, the maximum number of formed groups is the same as the size of the codebook, that is, the number of codewords of the codebook.

The base station scheduler 130 uses the feedback information from the user terminals to determine a codeword to be used for pre-coding and to determine a user terminal to which each stream will be allocated (S250). The base station scheduler 130 compares stream-based SINRs of users by the user terminal groups formed in step S240 and allocates a corresponding stream to a user whose SINR is the largest. When the corresponding stream is allocated to the user terminal corresponding to the largest SINR as described above, the entire transmission rate is calculated by adding the rates of the selected user terminals from the user terminal groups, and a codeword of a user terminal group corresponding to the largest entire transmission rate is determined as a codeword to be used for pre-coding.

The COMBF precoder 150 of the base station performs pre-coding by use of the codeword determined in step S250 and a unitary matrix appointed between the transmitter and the receiver in advance (S260).

Specifically, each of the weighting units 151 for individual streams multiplies data to be transmitted by the determined codeword, as in Equation 3.

$$W_{q^*}(t)s(t) \quad \text{(Equation 3)}$$
$$W_{q^*}(t) = [w_{q^*,1}(t), w_{q^*,2}(t), \ldots, w_{q^*,N_s}(t)]$$
$$s(t) = \left[s_{k_1^*}(t), s_{k_2^*}(t), \ldots, s_{k_{N_s}^*}(t)\right]^T$$

Here, s(t) represents data to be transmitted in a timeslot t, and $W_{q^*}(t)$ represents the determined codeword. Further, $k_n^*$ represents a user terminal to which the n-th stream is allocated, and $w_{q^*,n}(t)$ represents the n-th column vector of the determined codeword $W_{q^*}(t)$.

In other words, since each stream is multiplied by each column vector of the determined codeword, different codeword vectors are applied to the individual streams and data is transmitted through multiple beams.

Next, the unitary matrix multipliers 152 multiplies output values of the weighting units 151 by the unitary matrix appointed between the transmitter and the receiver in advance, as in Equation 4.

$$U(t)W_{q^*}(t)s(t) \quad \text{(Equation 4)}$$

Here, U(t) represents a unitary matrix.

At this time, a channel change is artificially induced by changing the direction of a beam while maintaining transmission power of the beam by use of a different matrix every slot, thereby maximizing multiple user diversity gain.

The multiplexer 160 multiplexes the output values of the COMBF precoder 150, inserts a MIMO midamble, and transmits them through a plurality of transmitting antennas (S270).

In the COMBF method and apparatus according to the first exemplary embodiment of the present invention, a case where operation is performed in a multiple user MIMO mode has been described. However, operation may also be performed in a single user MIMO mode. In a COMBF method and apparatus in which operation is performed in a single user MIMO mode, in step S230, the user terminal may feed back an entire transmission rate of data that is capable of being transmitted through all streams by the index $q_k^*$ of the selected codeword and the selected codeword, and may not feed back the stream-based SINR by the selected codeword. Then, the scheduler 130 of the base station compares the entire transmission rates of all users, performs pre-coding of data of a user corresponding to the largest entire transmission rate by use of the codeword selected by the user, allocates all streams to the user, and transmits them. When the COMBF apparatus according to the first exemplary embodiment operates so that all of a plurality of streams are allocated to a single user, the user terminal grouping unit 120 may be omitted.

Next, a beamforming method and apparatus according to a second exemplary embodiment of the present invention will be described in detail with reference to the drawings.

In a beamforming method according to the second exemplary embodiment of the present invention, a large-sized codebook is divided to a plurality of groups, and different code groups are used as a codebook every timeslot. Therefore, since a codebook used in each timeslot is one code group of the entire codebook, when an index of codewords selected by a user terminal is fed back, it is unnecessary to feed back an index in the entire codebook and it is only required to feed back an index in a code group used in a corresponding timeslot. Therefore, it is possible to reduce system overhead for feedback. Hereinafter, this method is referred to as a codebook-based beamforming with code rotation (hereinafter referred to as "CBF-CR") method.

Figure 3:
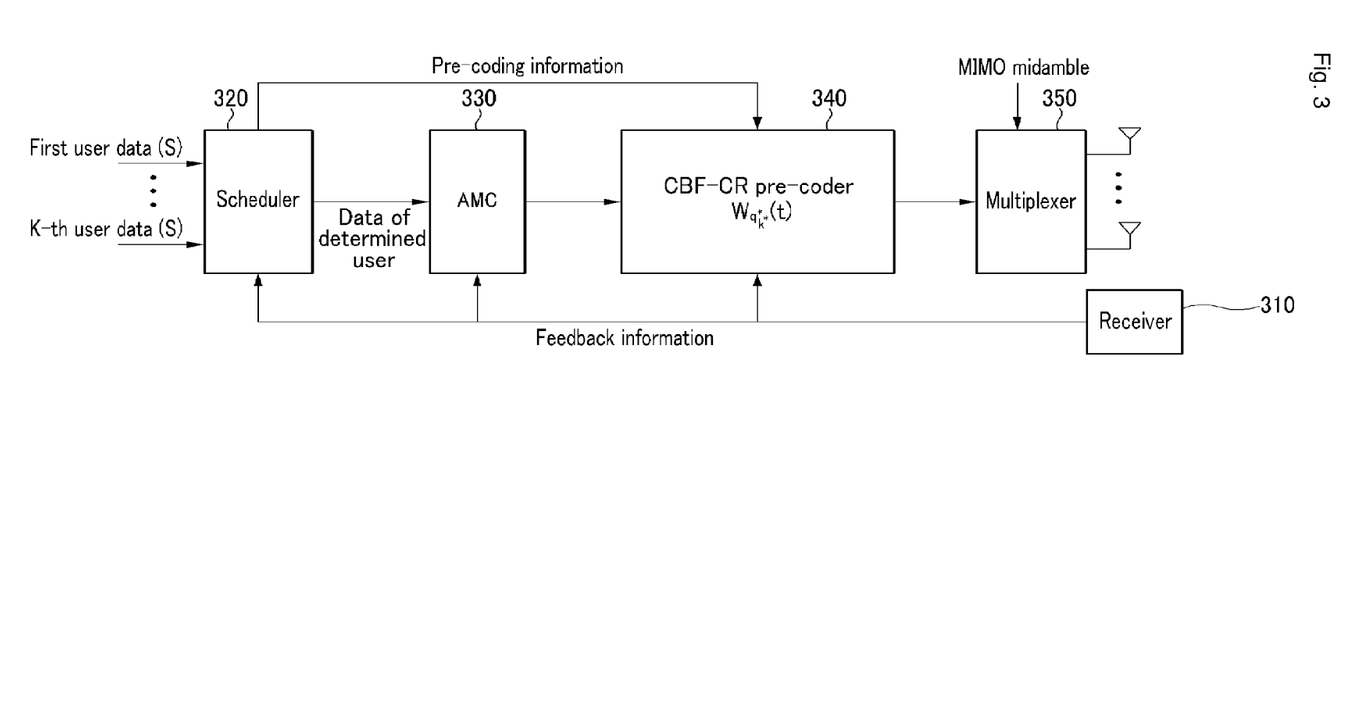
FIG. 3 is a schematic diagram of a CBR-CR apparatus according to the second exemplary embodiment of the present invention.

FIG. 3 is a schematic diagram of a CBR-CR apparatus according to the second exemplary embodiment of the present invention.

As shown in FIG. 3, a CBF-CR apparatus according to the second exemplary embodiment of the present invention includes a receiver 310, a scheduler 320, an AMC (adaptive modulation and coding) unit 330, a CBF-CR precoder 340, and a multiplexer 350.

The receiver 310 receives feedback information from individual user terminals and transmits them to the scheduler 320, the AMC unit 330, and the CBF-CR precoder 340. The feedback information includes CQI (SINR or transmission rate) and an index of codewords selected by individual users.

The scheduler 320 uses the feedback information of the user terminals to determine an optimum code vector and an optimum user terminal.

The AMC 330 performs modulating and coding on data to be transmitted.

The CBF-CR precoder 340 performs pre-coding by multiplying the data to be transmitted to the optimum user terminal by the optimum code vector.

The multiplexer 350 multiplexes output values of the CBF-CR precoder 340, inserts a MIMO midamble, and transmits them through a plurality of transmitting antennas.

Figure 4:
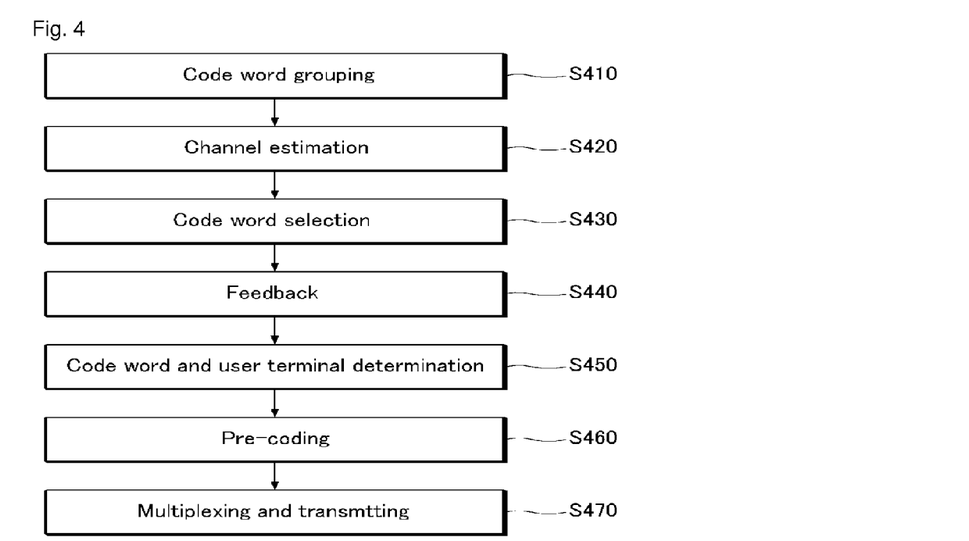
FIG. 4 is a flowchart illustrating a CBF-CR method according to an exemplary embodiment of the present invention.

Next, a CBF-CR method according to the second exemplary embodiment of the present invention is described in detail with reference to FIGS. 4 and 5. FIG. 4 is a flowchart illustrating a CBF-CR method according to an exemplary embodiment of the present invention.

First, a CBF-CR apparatus groups codewords of a codebook (S410). FIG. 5 is a drawing illustrating a method of dividing a C-bit codebook into a G-number of codeword groups.

As described in the first exemplary embodiment, in the case of using a C-bit codebook, C-bits are required to transmit a codeword selected by a user terminal, each codeword of a codebook for transmitting a signal beam is composed of one vector, and each codeword of a codebook for transmitting multiple beams is composed of a matrix. Since the second exemplary embodiment of the present invention is a single beam transmitting method, each codeword in the second exemplary embodiment is composed of one vector.

Figure 5:
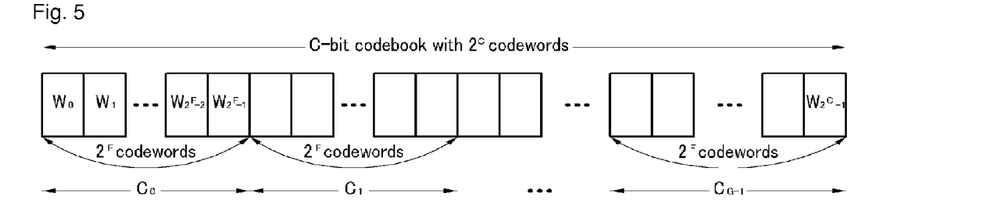
FIG. 5 is a drawing illustrating a method of dividing a C-bit codebook into a G-number of codeword groups.

As shown in FIG. 5, the C-bit codebook has a $2^C$-number of codewords ($w_0, w_1, \ldots, w_{2^C-1}$). When the $2^C$-number of codewords are divided into a G-number of codeword groups ($C_0, C_1, \ldots, C_{G-1}$), if iMod ($2^C$, G)=0 is satisfied, one codeword group is composed of $2^C/G$-number of codewords. As shown in FIG. 5, if the codewords is divided in the order of the codeword index by $2^F$, the (g+1)-th code group can be expressed as $C_g = \{w_{g2^F}, w_{g2^F+1}, \ldots, w_{(g+1)2^F-1}\}$.

In the second exemplary embodiment of the present invention, each codeword group is used as a codebook and is changed to another code group to be used every timeslot. In other words, each of the G-number of F-bit codeword groups ($C_0, C_1, \ldots, C_{G-1}$) is considered as one F-bit codebook, one codeword group is used as a codebook in one timeslot to perform pre-coding, and different codewords groups are used as a codebook every timeslot. Assuming that when a codeword group C(t) used in a timeslot t satisfies t̃=mod(t, G), C(t)=$C_{\tilde{t}}$ is satisfied, and the G-number of F-bit codeword groups may be repeatedly used every G-number of timeslots.

Therefore, since an F-bit codebook is used every timeslot, each terminal requires F bits for feeding back the selected index of codewords. Further, since different codeword groups are used every timeslot, if the direction of a beam is changed every timeslot, multiple user diversity gain is improved.

Next, the user terminal performs channel estimation by use of a pilot transmitted through the MIMO midamble (S420). The user terminal performs channel estimation in the same manner as described in the first exemplary embodiment, and calculates $\hat{H}_k$ of an estimated channel.

The user terminal selects a codeword to be used for pre-coding from a codeword group assigned to the timeslot t (S430). The user terminal calculates $|\hat{H}_k w_q(t)|^2$ with respect to each of the codewords of the codeword group assigned to the timeslot t and selects a codeword vector. Here, $w_q(t)$ (q=0, 1, 2, ..., $2^F-1$) represents codewords belonging in the codeword group assigned to the timeslot t.

The user terminals feed back CQI when pre-coding is performed by use of the index $q_k^*$ of selected codewords and the selected codewords (S440).

The base station scheduler 320 uses the feedback information fed back from the user terminals to determine an optimum codeword and an optimum user terminal (S450). The base station scheduler 320 determines as the optimum user terminal a user terminal having the largest transmission rate of the feedback information from the user terminals, and determines as the optimum codeword a codeword selected by the optimum user terminal. The optimum codeword and the optimum user terminal may be determined by another method having been used for determining an optimum codeword and an optimum user terminal in an existing CBF method.

The CBF-CR precoder 340 of the base station performs pre-coding by use of the codeword determined in step S450 (S460). The precoder 340 outputs values obtained by multiplying data to be transmitted to the determined user terminal by the determined codeword, as in Equation 5.

$$w_{q_{k^*}^*}(t) s_{k^*}(t) \quad \text{(Equation 5)}$$

Here, k* represents the user terminal determined in step S450, $q_{k^*}^*$ represents an index of codewords selected by the user terminal k*, $w_{q_{k^*}^*}(t)$ represents the codewords corresponding to the timeslot t determined in step S450, that is, the codewords selected by the user terminal k*, and $s_{k^*}(t)$ represents data to be transmitted to the user terminal k* in the timeslot t.

The multiplexer 350 multiplexes the output values of the CBF-CR precoder 340, inserts MIMO midamble, and transmits them through a plurality of transmitting antennas (S470).

Next, a multiple beamforming method and apparatus according to a third exemplary embodiment of the present invention will be described in detail with reference to the drawings.

A multiple beamforming method and apparatus according to the third exemplary embodiment of the present invention is similar to the second exemplary embodiment in that a codebook is divided into codeword groups to reduce overhead during feedback by a user terminal, and is similar to the first exemplary embodiment in that a codeword is formed of a matrix and a plurality of streams are simultaneously transmitted to a plurality of antennas. Hereinafter, the above-mentioned method is referred to as a codebook-based multiple beamforming with code rotation (hereinafter referred to as "CMBF-CR") method.

Figure 6:
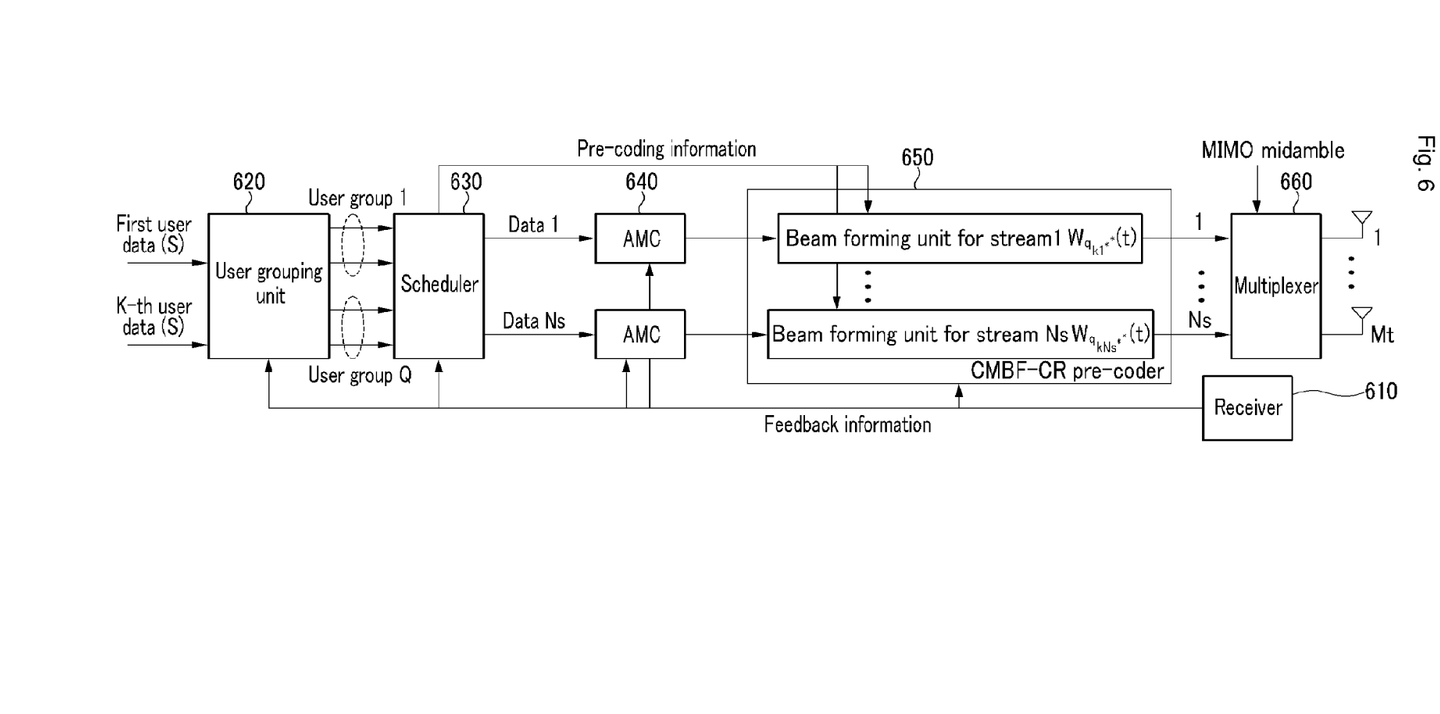
FIG. 6 is a schematic diagram of a CMBF-CR apparatus according to the third exemplary embodiment of the present invention.

FIG. 6 is a schematic diagram of a CMBF-CR apparatus according to the third exemplary embodiment of the present invention.

As shown in FIG. 6, a CMBF-CR apparatus according to the third exemplary embodiment of the present invention includes a receiver 610, a user terminal grouping unit 620, a scheduler 630, AMCs 640, a CMBF-CR precoder 650, and a multiplexer 660.

The receiver 610, the user terminal grouping unit 620, the scheduler 630, the AMCs 640, and the multiplexer 660 perform the same or similar functions as the receiver 110, the user terminal grouping unit 120, the scheduler 130, the AMCs 140, and the multiplexer 160 of FIG. 1.

The CMBF-CR precoder 650 includes a beamforming unit for individual streams. The CMBF-CR precoder 650 performs pre-coding by multiplying data to be transmitted by codeword matrixes determined by the scheduler 630.

Figure 7:
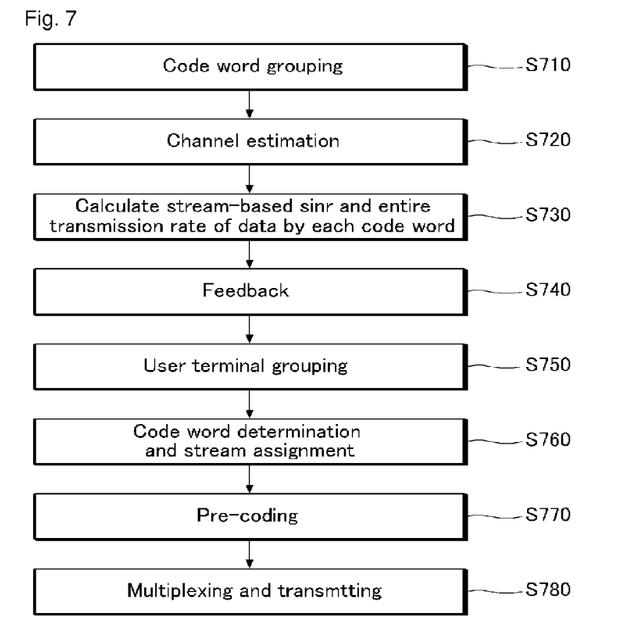
FIG. 7 is a flowchart illustrating a CMBF-CR method according to the third exemplary embodiment of the present invention.

Next, a CMBF-CR method according to the third exemplary embodiment of the present invention will be described in detail with reference to FIG. 7. FIG. 7 is a flowchart illustrating a CMBF-CR method according to the third exemplary embodiment of the present invention.

First, the CMBF-CR apparatus groups codewords of a codebook as described with respect to step S410 (S710).

The user terminal channel estimation by use of a pilot transmitted through a MIMO midamble (S720). The user terminal performs channel estimation in the same manner as described in the first exemplary embodiment, and calculates an estimated channel $\hat{H}_k$.

The user terminal measures stream-based SINRs or transmission rates of data by individual codewords of a codeword group assigned to the estimated channel $\hat{H}_k$ and a timeslot t, and calculates the entire transmission rate of data that is capable of being transmitted through all streams (S730).

The user terminal selects a codeword corresponding to the largest transmission rate from the codeword group assigned to the timeslot t, and transmits an index $q_k^*$ of the selected codeword and stream-based SINR belonging to the codeword to the base station as feedback information (S740). In this case, in order to feed back the selected codeword index, F bits are necessary.

The user grouping unit 620 of the base station groups the users by use of feedback information received from the individual user terminals (S750), and the scheduler 630 of the base station determines a codeword to be used for pre-decoding by use of the feedback information from the user terminals and allocates streams to the users (S760). The user grouping, codeword determining, and stream allocating methods are the same as those in the first exemplary embodiment.

The CMBF-CR precoder 650 of the base station performs pre-coding by use of the codeword determined in step S760 (S770). The CMBF-CR precoder 650 outputs values obtained by data to be transmitted by the determined codeword as Equation 6.

$$W_{q^*}(t) s(t) \quad \text{(Equation 6)}$$
$$W_{q^*}(t) = [w_{q^*,1}(t), w_{q^*,2}(t), \ldots, w_{q^*,N_s}(t)]$$
$$s(t) = \left[ s_{k_1^*}(t), s_{k_2^*}(t), \ldots, s_{k_{N_s}^*}(t) \right]^T$$

Here, s(t) represents data to be transmitted in a timeslot t, and $W_{q^*}(t)$ represents the determined codeword. Further, $k_n^*$ represents a user to which the n-th stream is allocated. In other words, since the individual streams are multiplied by individual column vectors of the determined codeword, different code vectors are applied to every stream and data is transmitted through multiple beams.

The multiplexer 660 multiplexes the output values of the CMBF-CR precoder 650, inserts MIMO midambles, and transmits them through a plurality of transmitting antennas (S780).

In the third exemplary embodiment of the present invention, a case where the CMBF-CR apparatus operates in a multiple user MIMO mode is described. However, the CMBF-CR apparatus may operate in a single user MIMO mode. In the case where the CMBF-CR apparatus operates in a single user MIMO mode, in step S740, the user terminal feeds back only the entire transmission rate of data that is capable of being transmitted through all streams by an index $q_k^*$ of the selected codeword and the selected codeword. Then, the scheduler 630 of the base station compares the entire transmission rates of all users, performs pre-coding on a user corresponding to the largest entire transmission rate by use of a codeword selected by the user, allocates all streams to the user, and transmits them to the user. When the CMBF-CR apparatus according to the third exemplary embodiment operates to transmit all of a plurality of streams to one user, the user terminal grouping unit 620 may be omitted.

Figure 8:
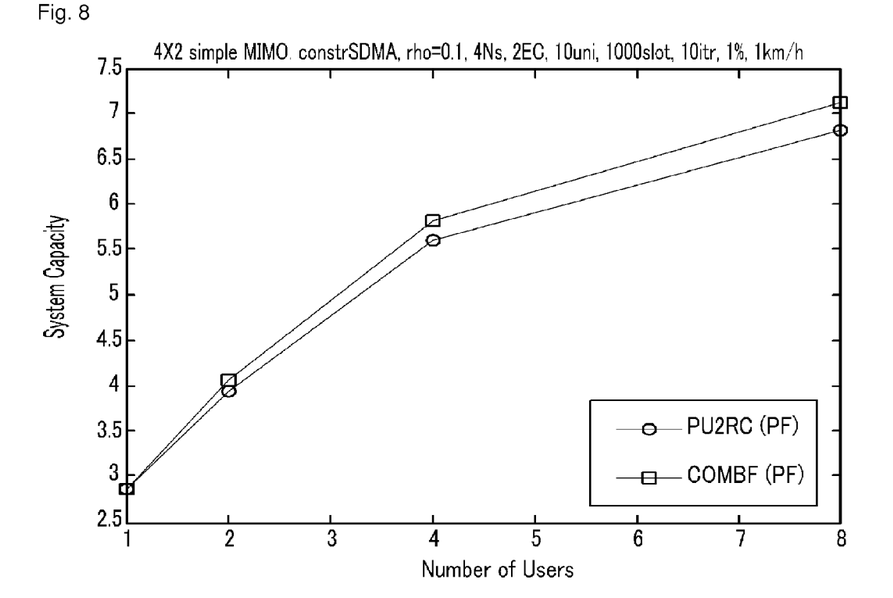
FIG. 8 is a drawing illustrating system capacity in the COMBF method according to the first exemplary embodiment of the present invention.

FIG. 8 is a drawing illustrating system capacity in the COMBF method according to the first exemplary embodiment of the present invention. FIG. 8 illustrating a relationship between a change in the number of users and the system capacity of PU2RC and a relationship between a change in the number of users and system capacity when the COMBF apparatus operates in the multiple user MIMO mode. FIG. 8 illustrates a case where 4 streams are transmitted when a correlation between transmitting antennas in a 4×2 MIMO system is 0.1. In this case, a codebook use two codewords (1-bit feedback) in a 6-bit matrix codebook proposed for closed-loop MIMO pre-coding of IEEE802.16e, and 10 random unitary matrixes are repeatedly used. As shown in FIG. 8, the system capacity in the COMBF method according to the first exemplary embodiment of the present invention is larger than the system capacity in the PU2RC method. The system capacity difference may increase as the number of users increases. The reason is that a channel change is artificially induced by changing the direction of the beam by use of different unitary matrixes every timeslot, thereby maximizing the multiple user diversity gain.

Figure 9:
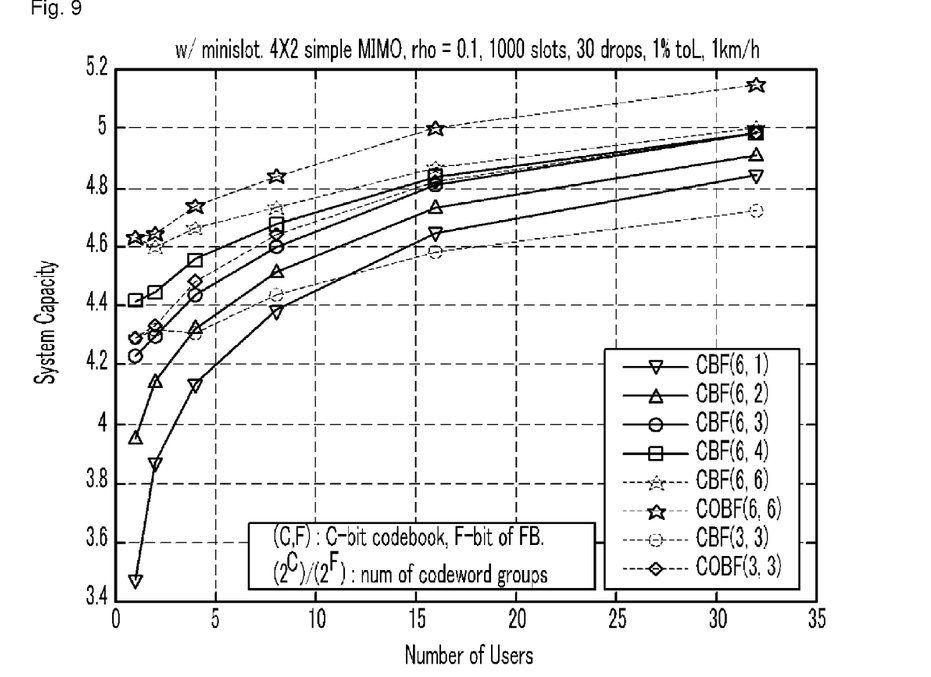
FIG. 9 is a drawing illustrating system capacities in the CBF-CR method according to the second exemplary embodiment of the present invention.

FIG. 9 is a drawing illustrating system capacities in the CBF-CR method according to the second exemplary embodiment of the present invention. In FIG. 9, CBF(C,F) represents system capacity in a CBR-CR method in which a C-bit codebook is divided into F-bit codeword groups. CBF(6,6) and COBF(6,6) represent system capacities in a CBF method and a COBF method each using a 6-bit codebook, respectively, and CBF(3,3) and COBF(3,3) represent system capacities in a CBF method and a COBF method each using a 3-bit codebook, respectively. A 6-bit vector codebook of IEEE802.16e is used as the codebook.

Referring to CBF(6,6) and CBF (6,F), it can be seen that CBF(6,F) gradually approaches CBF(6,6) as the number of users increases. Particularly, in case of CBF(6,3), it can be seen that, if the number of users is equal to or larger than 15, CBF(6,3) exhibits substantially the same system capacity as CBF(6,6). Therefore, it is possible to reduce a feedback amount by half while substantially maintaining the system capacity.

Further, referring to CBF(6,3) and COBF(3,3), it can be seen that the system capacities are substantially the same, which represents that a sufficient opportunistic effect can be obtained through codeword circulation.

Figure 10:
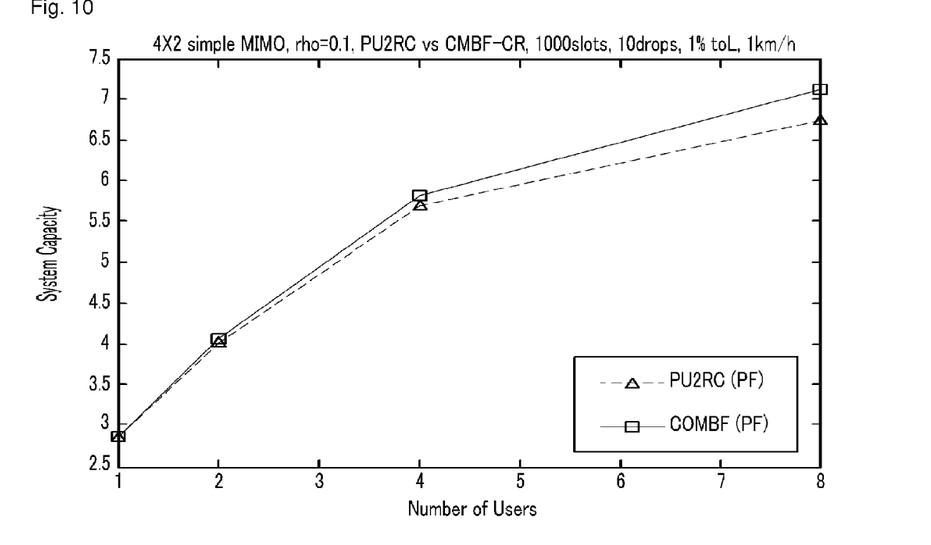
FIG. 10 is a drawing illustrating system capacity in the CMBF-CR method according to the third exemplary embodiment of the present invention.

FIG. 10 is a drawing illustrating system capacity in the CMBF-CR method according to the third exemplary embodiment of the present invention. FIG. 10 illustrates a relationship between a change in the number of users and the system capacity of PU2RC and a relationship between a change in the number of users and system capacity when the COMBF apparatus operates in the multiple user MIMO mode. The PU2RC of FIG. 10 represents an existing PU2RC using a 1-bit PU2RC codebook, and CMBF(6,1) represents CMBF-CR in which a 6-bit matrix codebook of IEEE802.16e is divided into 1-bit codeword groups and a codeword group used as a codebook is changed as time passes. As shown in FIG. 10, it can be seen that CMBF(6,1) is larger in system capacity than PU2RC(1-PC). That is, feedback amounts in CMBF(6,1) and PU2RC(1-PC) are the same, but the performance is improved through codeword circulation.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A beamforming method for use in a base station for transmitting a plurality of streams through a plurality of antennas, the method comprising:
   receiving feedback information including information on a first codeword selected from a codebook including a plurality of codewords from each of a plurality of user terminals;
   grouping the plurality of user terminals by use of the feedback information from each user terminal;
   determining a user terminal to which the plurality of streams will be assigned of the plurality of user terminals and determining a second codeword to be used for beamforming from the codebook, by use of the feedback information of each user terminal and grouping information;
   multiplying data to be transmitted through the plurality of steams by the second codeword; and
   multiplying the data, having been multiplied by the second codeword, by a unitary matrix.

2. The method of claim 1, wherein an index of the first codewords of the individual user terminals is a codeword having the largest entire transmission rate of the plurality of codewords, and the entire transmission rate of each codeword is determined by stream-based channel quality information by each codeword.

3. The method of claim 1, wherein the grouping is performed so that user terminals whose information of the first codewords are the same belong in one user terminal group.

4. The method of claim 1, wherein the feedback information further includes stream-based channel quality information by the first codeword, and in the determining, the second codeword is determined by use of the steam-based channel quality information by the first codeword.

5. The method of claim 4, wherein the determining includes:

comparing the stream-based channel quality information of the user terminals by the user terminal groups;

assigning a corresponding stream to a user terminal whose channel quality information is the largest;

calculating an entire transmission rate by the user terminal groups when it is assumed that the streams have been assigned as in the assigning of the corresponding stream;

determining a codeword selected by each of user terminals of a user terminal group whose entire transmission rate is the largest as the second codeword; and determining a user terminal to which the streams is assigned as a stream assignment result of the user terminal group whose entire transmission rate is the largest.

6. The method of claim 2, wherein the feedback information includes an index of a stream whose stream-based channel quality information by the first codeword is the largest and the largest channel quality information of the stream, and, in the determining, only one stream is assigned to a user terminal having transmitted the index of the stream whose stream-base channel quality information is the largest and the largest channel quality information of the stream as feedback information.

7. The method of claim 1, wherein, in the multiplying, different unitary matrixes are multiplied every timeslot.

8. A beamforming method for use in a base station, the method comprising:

dividing a plurality of codewords of a codebook into a plurality of codeword groups;

determining a codeword group to be used in a corresponding timeslot from the plurality of codeword groups;

receiving feedback information including an index of a first codeword selected from the determined codeword group from each of a plurality of user terminals;

determining a user terminal to which data will be transmitted in a corresponding timeslot by use of the feedback information of each user terminal, and determining the first codeword of the user terminal to which data will be transmitted in the corresponding timeslot as the second codeword; and performing beamforming by use of the second codeword.

9. The method of claim 8, wherein the dividing is performed so that the codewords of the codebook belong in each of the plurality of codeword groups by a predetermined number in order of the index of the codewords.

10. The method of claim 8, wherein the determining of the codeword group is performed so that different codeword groups of the plurality of codeword groups are used every timeslot.

11. The method of claim 8, wherein the determining of the codeword group is performed by giving an order to the plurality of codeword groups so that the codeword groups are cyclically used in order every timeslot.

12. The method of claim 8, wherein the first codeword is a codeword that satisfies a condition in which the square of the absolute value of a value obtained by multiplying the estimated channel by the codeword is the largest, of the codewords of the determined codeword group.

13. A beamforming method for use in a base station for transmitting a plurality of streams through a plurality of antennas, the method comprising:

dividing a plurality of codewords of a codebook into a plurality of codeword groups;

determining a codeword group to be used in a corresponding timeslot from the plurality of codeword groups;

receiving feedback information including an index of a first codeword selected from the determined codeword group from each of a plurality of user terminals;

grouping the plurality of user terminals by use of the feedback information from the individual user terminals;

determining a user terminal to which the plurality of streams will be assigned and a second codeword to be used for beamforming from the codebook by use of the feedback information of the individual user terminals and the results of the grouping of the plurality of user terminals; and performing beamforming by use of the second codeword.

14. The method of claim 13, further comprising multiplying output values of the beamforming by a unitary matrix appointed between the base station and the user terminal.

15. The method of claim 14, wherein the unitary matrix is different unitary matrixes used every timeslot.

16. The method of claim 13, wherein the determining of the codeword group is performed so that different codeword groups of the plurality of codeword groups are used every timeslot.

17. The method of claim 13, wherein the index of the first codeword is an index of a codeword whose entire transmission rate is the largest when stream-based channel quality information by the individual codewords of the determined codeword group are measured and entire transmission rates by the individual codewords are calculated by user of the stream-base channel quality information.

18. The method of claim 17, wherein the feedback information includes stream-based channel quality information by the first codeword.

19. The method of claim 17, wherein the grouping of the plurality of user terminals is performed so that user terminals whose first codewords are the same belong in one user terminal group.

20. The method of claim 19, wherein the determining of the user terminal includes:

comparing the stream-based channel quality information of the user terminals by the user terminal groups;

assigning a corresponding stream to a user terminal whose channel quality information is the largest;

calculating an entire transmission rate by the user terminal groups when it is assumed that the streams have been assigned as in the assigning of the corresponding stream;

determining a first codeword of each of user terminals of a user terminal group whose entire transmission rate is the largest as the second codeword; and determining a user terminal to which the streams are assigned as a stream assignment result of the user terminal group whose entire transmission rates is the largest.

* * * * *